(12) United States Patent
Pontius

(10) Patent No.: US 7,811,406 B1
(45) Date of Patent: Oct. 12, 2010

(54) SHAPE BONDING METHOD

(75) Inventor: James T. Pontius, Glenelg, MD (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 186 days.

(21) Appl. No.: 12/249,265

(22) Filed: Oct. 10, 2008

Related U.S. Application Data

(60) Provisional application No. 60/979,109, filed on Oct. 11, 2007.

(51) Int. Cl.
 *B29C 65/00* (2006.01)
 *B32B 7/14* (2006.01)
 *B32B 37/00* (2006.01)

(52) U.S. Cl. .................. 156/295; 156/291; 264/258
(58) Field of Classification Search .................. None
 See application file for complete search history.

(56) References Cited

U.S. PATENT DOCUMENTS

| 4,640,583 | A | * | 2/1987 | Hoshikawa et al. | ......... 349/153 |
| 6,432,253 | B1 | * | 8/2002 | Chung | ........................ 156/295 |
| 2002/0197843 | A1 | * | 12/2002 | Jiang et al. | .................. 438/613 |

* cited by examiner

*Primary Examiner*—Mark A. Osele
*Assistant Examiner*—Nickolas Harm
(74) *Attorney, Agent, or Firm*—Matthew F. Johnston

(57) ABSTRACT

The present invention is directed to a method of bonding at least two surfaces together. The methods step of the present invention include applying a strip of adhesive to a first surface along a predefined outer boundary of a bond area and thereby defining a remaining open area there within. A second surface, or gusset plate, is affixed onto the adhesive before the adhesive cures. The strip of adhesive is allowed to cure and then a second amount of adhesive is applied to cover the remaining open area and substantially fill a void between said first and second surfaces about said bond area. A stencil may be used to precisely apply the strip of adhesive. When the strip cures, it acts as a dam to prevent overflow of the subsequent application of adhesive to undesired areas. The method results in a precise bond area free of undesired shapes and of a preferred profile which eliminate the drawbacks of the prior art bonds.

21 Claims, 6 Drawing Sheets

SHAPE BONDING METHOD

ORIGIN OF INVENTION

The invention described herein was made by an employee of the United States Government, and may be manufactured and used by or for the Government for governmental purposes without the payment of any royalties thereon or therefor.

RELATED APPLICATIONS

This application is based upon prior filed provisional patent application Ser. No. 60/979,109 filed Oct. 11, 2007 for "ADVANCED ADHESIVE BOND SHAPE TAILORING FOR LARGE COMPOSITE PRIMARY STRUCTURE SUBJECTED TO CRYOGENIC AND AMBIENT LOADING ENVIRONMENTS" the entire contents of which are herein incorporated by reference.

BACKGROUND OF THE INVENTION

1. Field of the Invention

This invention relates generally to structurally bonding structural elements together using adhesive placed in a specific shape/profile, and more particularly to advanced adhesive bond shape tailoring suitable to large composite primary structures subjected to cryogenic and ambient loading environments.

2. Discussion of the Related Art

Bonding of primary structures to withstand cryogenic temperatures and high stress launch environment is a fundamental requirement of deploying cryogenic primary structures. Cryogenic primary structures may include space structures made of composite materials. Failure of the bonds between structural elements can result in significant damage to the primary structures in an environment where repair is unfeasible.

Conventional bonds utilize a gusset plate to bond together composite tubes. Previously adhesive was placed between the gusset plate and composite tubes by simply spreading a thin layer of adhesive to the tube and then affixing the gusset plate. However, prior art techniques to spread the adhesive often resulted in bond areas having profiles that often caused delamination or separation of the composite tubes as well as undesired stress placed on the surface of the tubes due to either the profile of the perimeter of the bond area, improper location of the bond area proximate the cut end of the tubes, or non-uniform and improper thickness of the adhesive. The adverse effects, of the aforementioned prior art techniques of applying the adhesives, are exacerbated by the extreme cryogenic temperatures reaching 27 degrees Kelvin. Failure to properly control the application of the adhesive and resultant bond area will result in a significant reduction in the strength of the bond, strip away the upper layers of composite materials or otherwise induce delamination/separation and induce undue stress on the tubes when the structure is exposed to extremely low temperatures.

Adhesive thickness should be minimal as thick layers of adhesive may strip away the upper layers of composite mater when exposed to extremely low temperatures due to the mismatch in coefficient of thermal expansion of the materials. Accurately and precisely tailoring the shape of the adhesive applied onto the primary structures such that these needs are met significantly increases bond strength and reduces susceptibility to cryogenic temperatures and high stress environments.

Additionally, stress applied onto the bond may be significantly reduced by accurately shaping the adhesive with a large radius, particularly in areas of high stress. Finally, accurately and precisely tailoring the shape of the applied adhesive may reduce or prevent the need for clean out of areas in the primary structure that have limited access during the assembly of the primary structure.

For the reasons stated above, and for other reasons stated below which will become apparent to those skilled in the art upon reading and understanding the present specification, there is a need in the art for apparatus and methods to bond primary structures such that the bond survives cryogenic temperatures and demanding, high stress launch vehicle environment. There is also a need for improved apparatus and methods to accurately and precisely tailor the shape of adhesive applied onto primary structures to effectively bond these primary structures using a gusset plate.

SUMMARY OF THE INVENTION

The present invention is directed to a method of bonding at least two surfaces together. The methods step of the present invention include applying a strip of adhesive to a first surface along a predefined outer boundary of a bond area and thereby defining a remaining open area there within. A second surface or gusset plate is affixed onto the adhesive before the adhesive cures. The strip of adhesive is allowed to cure and then a second amount of adhesive is applied to cover the remaining open area and substantially fill a void between said first and second surfaces about the bond area. A stencil may be used to precisely apply the strip of adhesive. When the strip cures, it acts as a dam to prevent overflow of the subsequent application of adhesive to undesired areas and otherwise serve to precisely control the contour/shape of the overall bond area. The method results in a precise bond area free of undesired shapes and of a preferred profile which eliminates the drawbacks of the prior art bonds.

Apparatus, systems, and methods of varying scope are described herein. In addition to the aspects and advantages described in this summary, further aspects and advantages will become apparent by reference to the drawings and by reading the detailed description that follows.

DETAILED DESCRIPTION

In the following detailed description, reference is made to the accompanying drawings that form a part hereof, and in which is shown by way of illustration specific aspects which may be practiced. These aspects are described in sufficient detail to enable those skilled in the art to practice the aspects, and it is to be understood that other aspects may be utilized and that logical, mechanical, electrical and other changes may be made without departing from the scope of the aspects. The following detailed description is, therefore, not to be taken in a limiting sense.

The detailed description is divided into four sections. In the first section, a system level overview is described. In the second section, apparatus of aspects are described. In the third section, aspects of methods are described. Finally, in the fourth section, a conclusion of the detailed description is provided.

Figure 1:
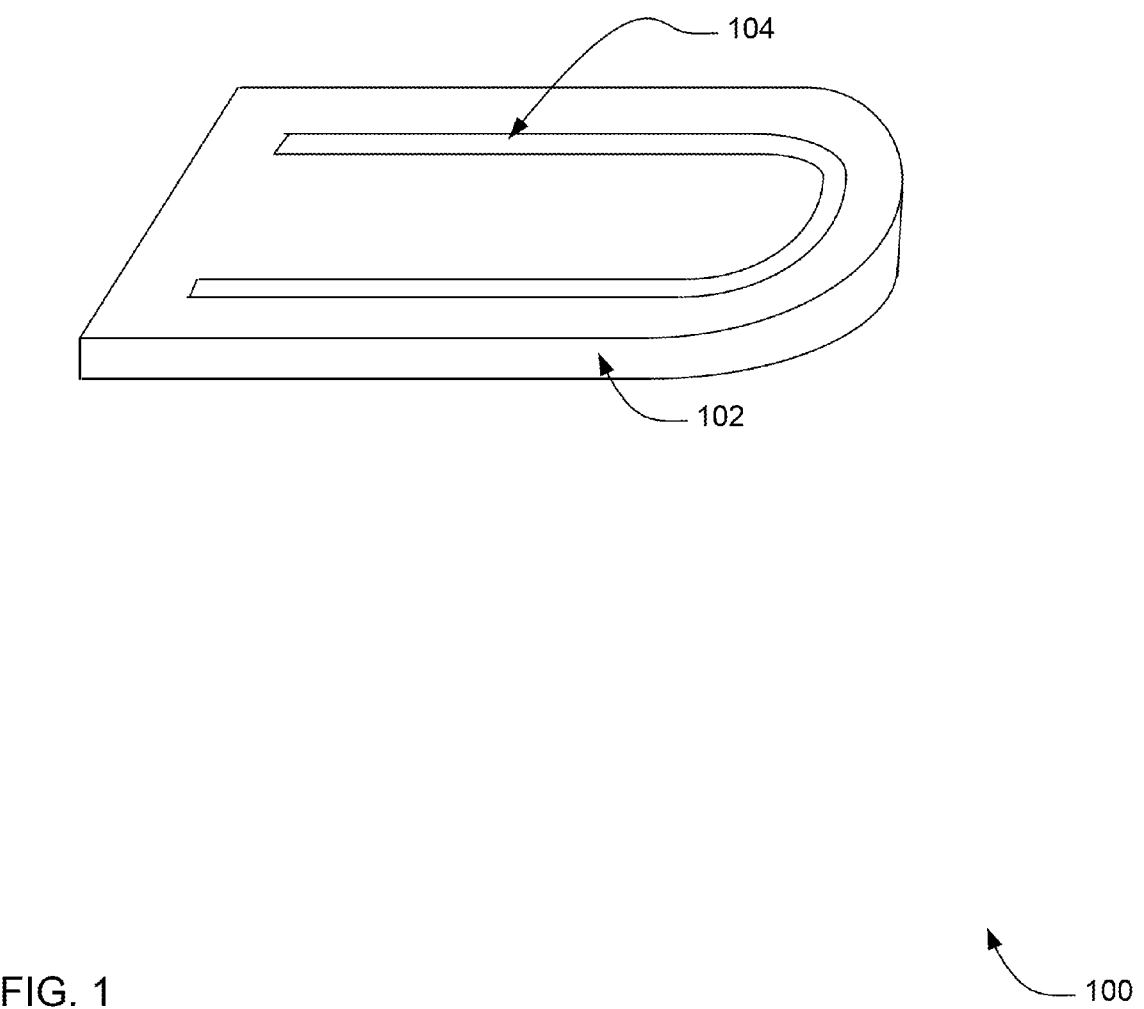
FIG. 1 is cross section block diagram of an overview of a system to accurately and precisely tailor the shape of adhesive applied onto primary structures, to effectively bond the primary structures together using a gusset plate.

FIG. 1 is cross section block diagram of an overview of a system to accurately and precisely tailor the shape of adhesive applied onto primary structures, to effectively bond the primary structures together using a gusset plate. System 100 solves the need in the art to accurately and precisely tailor the shape of adhesive applied onto the structural elements of a primary structure.

System 100 includes a flat sheet 102 impervious to adhesive, having a precisely uniform thickness, and a geometric cutout area 104 of a precisely defined shape outline.

Component 102 solves the need in the art to accurately and precisely tailor the shape of adhesive applied onto primary structures to effectively bond these primary structures by preventing excess adhesive from being applied onto the structural elements of the primary structure.

Component 104 solves the need in the art to accurately and precisely tailor the shape of adhesive applied onto primary structures to effectively bond these primary structures by precisely tailoring the shape of adhesive applied onto the structural elements of the primary structure.

The system level overview of the operation of an aspect is described in this section of the detailed description.

The stencil or stencil/template sheet 102 with a geometric cutout 104 is used to lay a bead of adhesive in the exact shape and location needed to bond structural elements of a primary structure to withstand cryogenic temperatures and high stress environments. The stencil/stencil/template is placed on the surface of the structural elements of the primary structure, adhesive is applied in the geometric cutout area, and excess adhesive is scraped off. The stencil/stencil/template sheet is removed leaving an outline of the desired adhesive shape profile. Once all adhesive outlines, or dams, are placed on composite tubes to be joined together, a gusset plate is affixed to bond the structural elements of the primary structure.

In some aspects, shims are placed in the center of the bond area to control final bond line thickness and then a gusset plate is placed onto the adhesive outline on the structural elements of the primary structure. Once the adhesive cures, the shims are removed leaving an adhesive dam.

In other aspects, the gusset plate has a hole pattern on its face. Once the adhesive cures, the shims are removed leaving an adhesive dam. Additional adhesive is then injected through the hole pattern in the gusset plate from the interior edge toward the outer edge, thus completely filling the area without voids.

In yet other aspects, the stencil/stencil/template has alignment features, cut out width and thickness details that precisely place an exact adhesive profile. The details may be varied depending on the desired bond line thickness and bond area placement.

While the system 100 is not limited to any particular flat sheet impervious to adhesive and any particular geometric cutout area, for sake of clarity a simplified flat sheet impervious to adhesive and a simplified geometric cutout area are described.

In the previous section, a system level overview of the operation of an embodiment was described. In this section, the particular apparatus of such an embodiment are described by reference to a series of diagrams.

Figure 2:
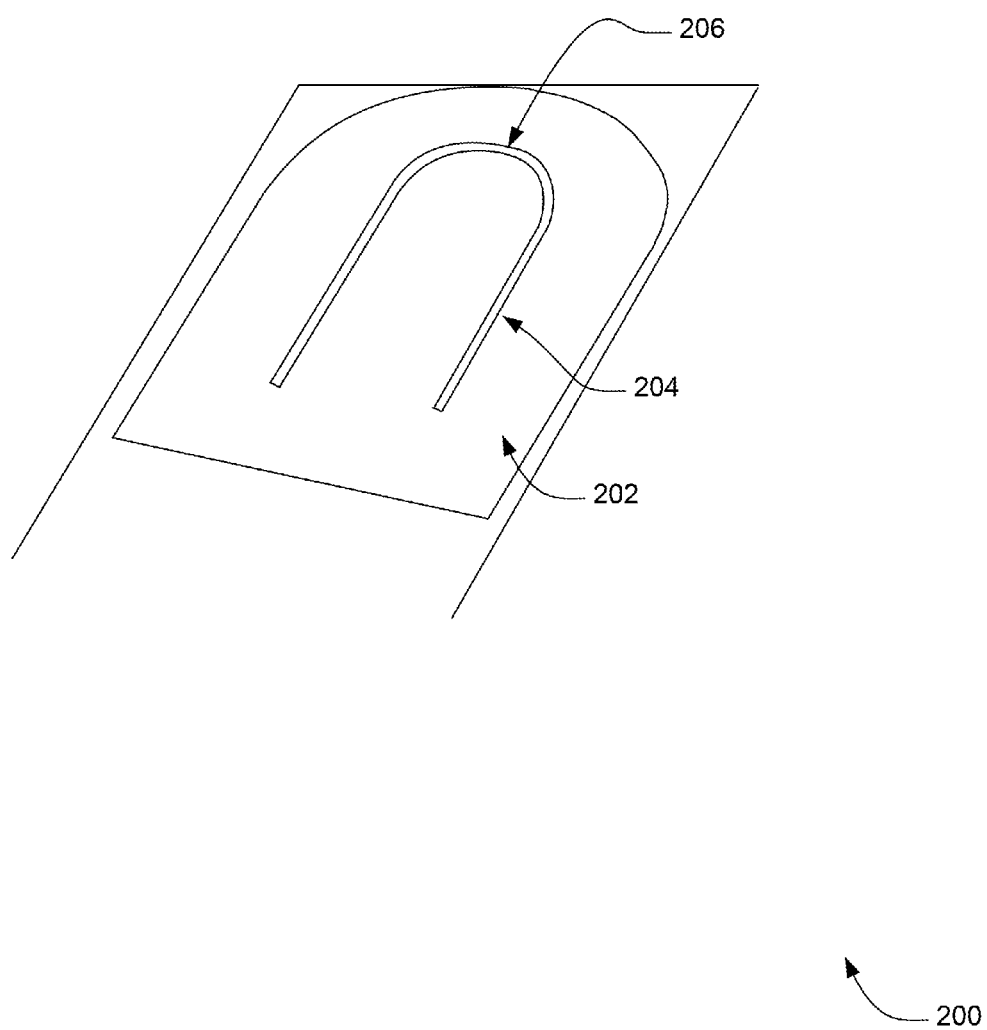
FIG. 2 is a cross section block diagram of an apparatus according to an aspect to accurately and precisely tailor the shape of adhesive applied onto primary structures.

FIG. 2 is a cross section block diagram of apparatus 200 according to an aspect to accurately and precisely tailor the shape of adhesive applied onto primary structures. Apparatus 200 solves the need in the art to accurately and precisely tailor the shape of adhesive applied onto the structural elements of a primary structure.

Apparatus 200 includes a flat sheet 202 impervious to adhesive, having a precisely uniform thickness, and a geometric cutout area 204 of a precisely defined shape outline. In some aspects, the geometric cutout area 204 includes the outline of a circular pattern 206. In other aspects, the radius of the circular pattern is proportional to the expected stress on the surfaces of the structural elements to be bonded. In yet other aspects, the sheet metal cut out stencil/stencil/template has a uniform thickness of 0.04 inches to minimize the adhesive thickness applied onto the surfaces s of the structural elements to be bonded.

Figure 3:
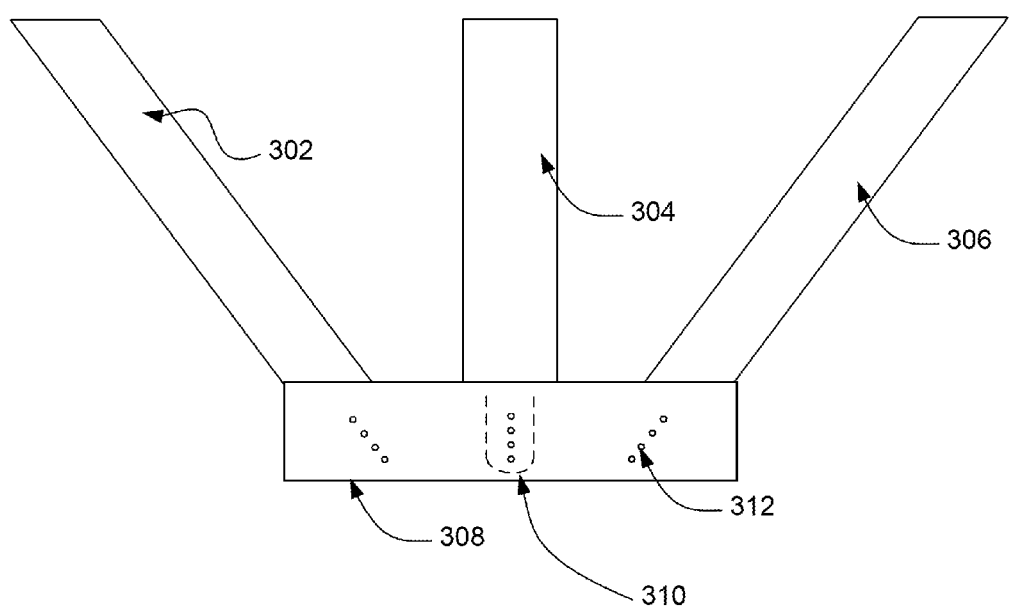
FIG. 3 is a cross section block diagram of an apparatus according to an aspect to effectively bond the primary structures together using a gusset plate.

FIG. 3 is a cross section block diagram of apparatus 300 according to an aspect to effectively bond the primary structures together using a gusset plate.

Apparatus 300 includes a first diagonal composite tube element 302, a vertical composite tube element 304, a second diagonal composite tube element 306, a gusset plate 308, a layer of adhesive 310 laid out in a precisely defined shape profile between the composite tube element and the gusset plate, and a hole pattern 312 on the face of the gusset plate. In some aspects, two or more surfaces are bonded with a predefined shape profile which includes applying adhesive in the shape of an outline of a predefined shape profile on two or more surfaces to be bonded, affixing a gusset plate onto the adhesive on the two or more surfaces, and applying additional adhesive to completely fill the interior of the adhesive shape profile. In other aspects, affixing the gusset plate includes affixing a gusset plate with a hole pattern on its face onto the two or more surfaces. In yet other aspects, applying additional adhesive to completely fill the interior of the adhesive shape profile includes allowing the adhesive to cure, thereby forming an adhesive dam, and injecting additional adhesive through the hole pattern on the face of the gusset plate to completely fill the interior of the adhesive shape profile.

In the previous section, apparatus of the operation of an embodiment was described. In this section, the particular methods performed by proper usage of such an embodiment are described by reference to a series of flowcharts.

Figure 4:
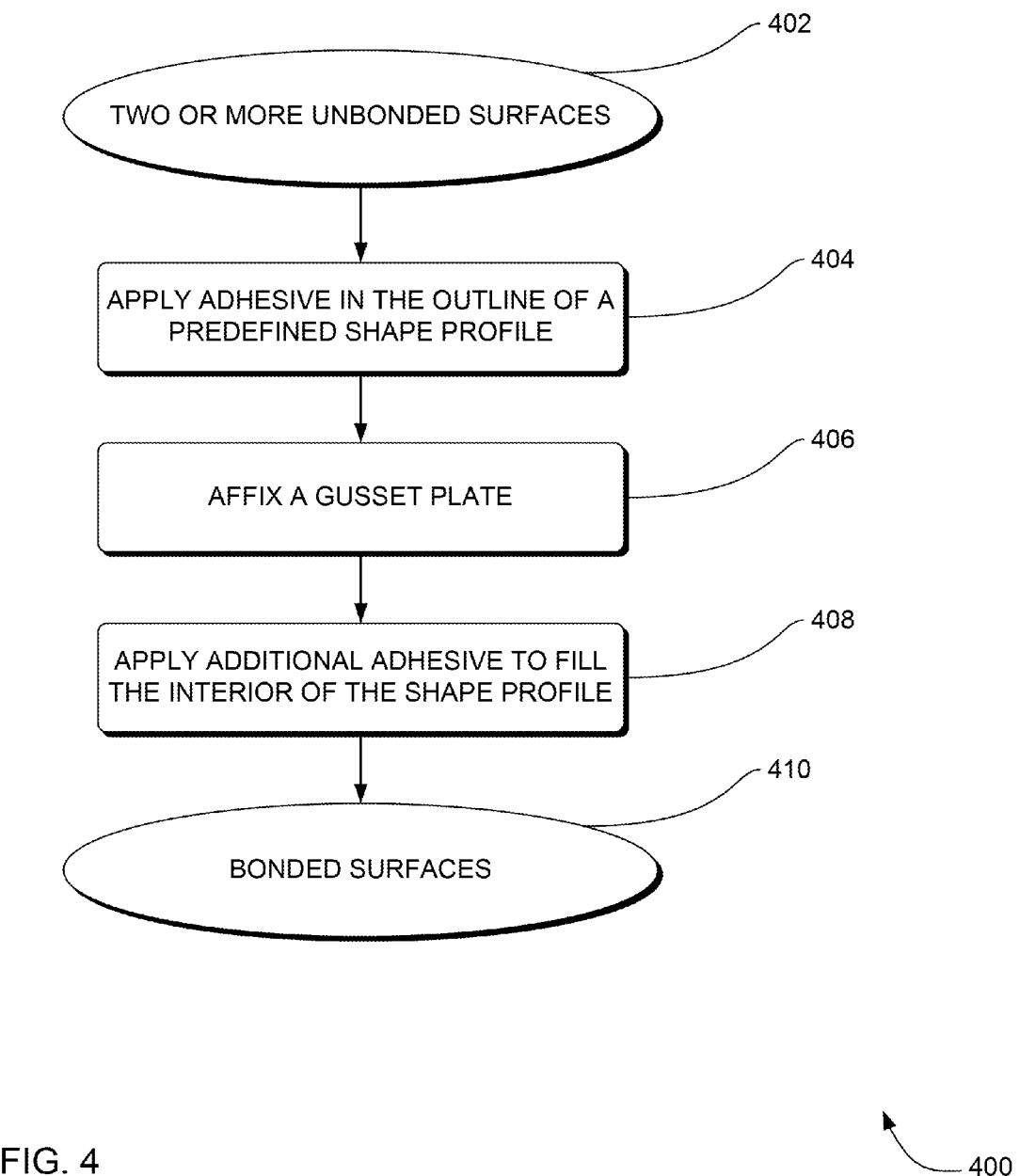
FIG. 4 is a flowchart of a method to accurately and precisely bond two or more surfaces by applying adhesive tailored to a predefined shape onto the surfaces according to an aspect.

FIG. 4 is a flowchart of a method 400 to accurately and precisely bond two or more surfaces by applying adhesive tailored to a predefined shape onto the surfaces according to an aspect. Method 400 solves the need in the art to bond primary structures such that the bond survives cryogenic temperatures and demanding, high stress launch vehicle environment.

Method 400 includes two or more un-bonded surfaces 402, applying adhesive in the outline of a predefined shape profile onto two or more un-bonded surfaces 404, affixing a gusset plate 406, applying additional adhesive to fill the interior of the shape profile 408, and yields two or more bonded surfaces 410.

Figure 5:
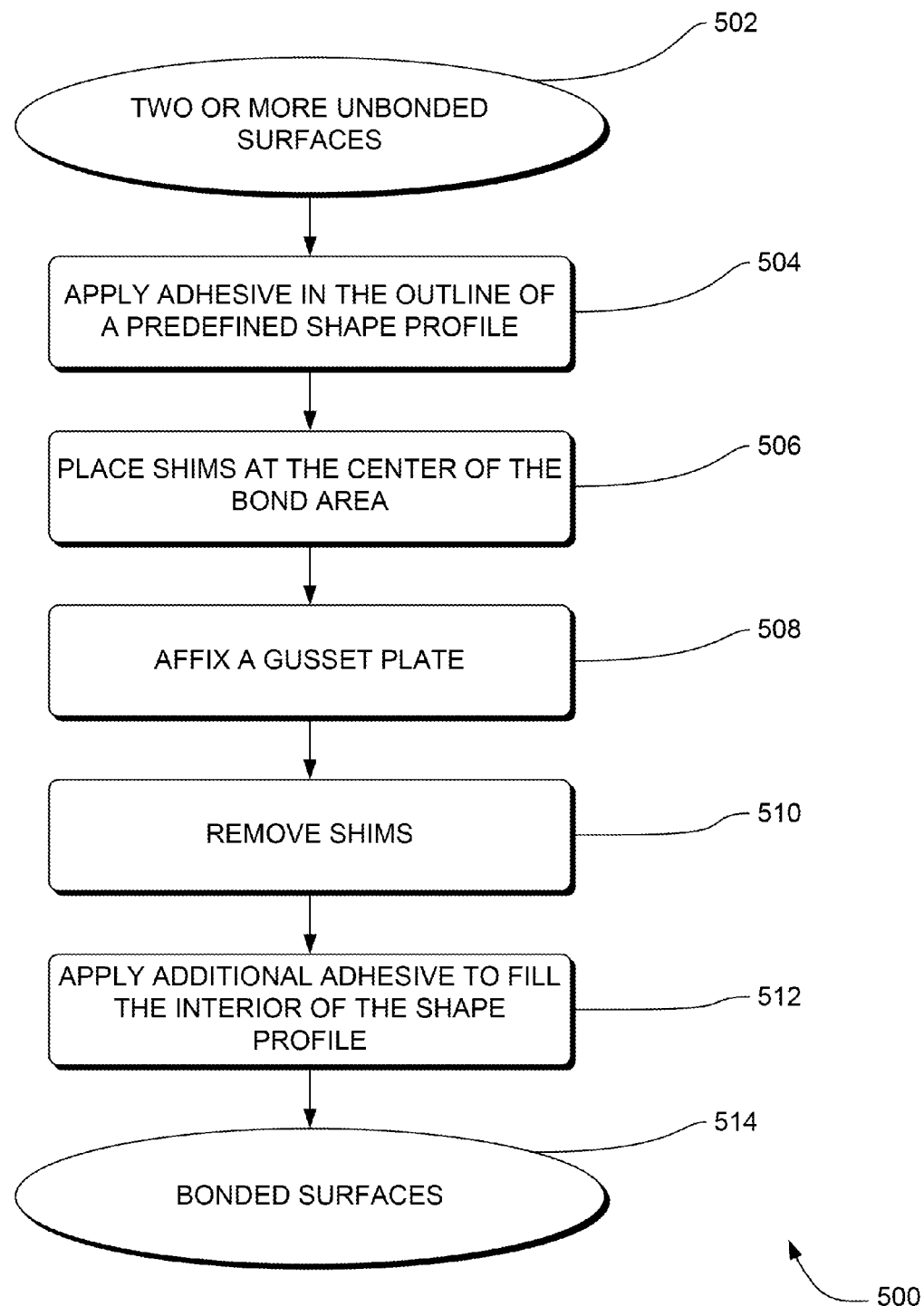
FIG. 5 is a flowchart of a method to accurately and precisely bond two or more surfaces by applying adhesive tailored to a predefined shape with a controlled final bond line thickness onto the surfaces according to an aspect.

FIG. 5 is a flowchart of a method 500 to accurately and precisely bond two or more surfaces by applying adhesive tailored to a predefined shape with a controlled final bond line thickness onto the surfaces according to an aspect. Method 500 solves the need in the art to bond primary structures such that the bond survives cryogenic temperatures and demanding, high stress launch vehicle environment.

Method 500 includes two or more un-bonded surfaces 502, applying adhesive in the outline of a predefined shape profile onto two or more un-bonded surfaces 504, placing shims at the center of the bond area 506, affixing a gusset plate 508, removing the shims from the center of the bond area 510, applying additional adhesive to fill the interior of the shape profile 512, and yields two or more bonded surfaces 514.

In some aspects, applying the adhesive in the shape of an outline of a predefined shape profile includes placing a stencil/stencil/template cutout sheet of the outline of the predefined adhesive shape profile on the two or more surfaces, applying adhesive within the boundary of the stencil/stencil/template cutout sheet, and removing the stencil/stencil/template cutout sheet.

In other aspects, affixing a gusset plate onto the adhesive on the surface of two or more surfaces further includes affixing a gusset plate with a hole pattern on its face onto the adhesive on the two or more surfaces.

In yet other aspects, applying additional adhesive to completely fill the interior of the adhesive shape profile includes allowing the adhesive to cure, thereby forming an adhesive dam, and injecting additional adhesive through the hole pattern on the face of the gusset plate to completely fill the interior of the adhesive shape profile.

In yet other aspects, placing a stencil/template cutout sheet of the outline of a predefined adhesive shape profile includes placing a sheet metal cut out stencil/template of the outline of a circular pattern on two or more surfaces. In yet other aspects, placing a stencil/template cutout sheet of the outline of a predefined adhesive shape profile includes placing a sheet metal cut out stencil/template of the outline of a circular pattern on two or more surfaces, in which the radius of the circular pattern is proportional to the expected stress on the two or more surfaces. In yet other aspects, the radius of the circular pattern is the full radius of the bond width. In yet other aspects, placing a stencil/template cutout sheet of the outline of a predefined adhesive shape profile includes placing a sheet metal cut out stencil/template of the outline of a circular pattern on two or more surfaces, in which the sheet metal cut out stencil/template has a uniform thickness of 0.04 inches.

In other aspects, applying adhesive in the shape of an outline of a predefined shape profile further includes placing a stencil/template sheet cut out such that the adhesive is kept from bonding all the way to the cut edge of the two or more surfaces being bonded. In yet other aspects, the two or more surfaces being bonded include two or more composite tubes.

Figure 6:
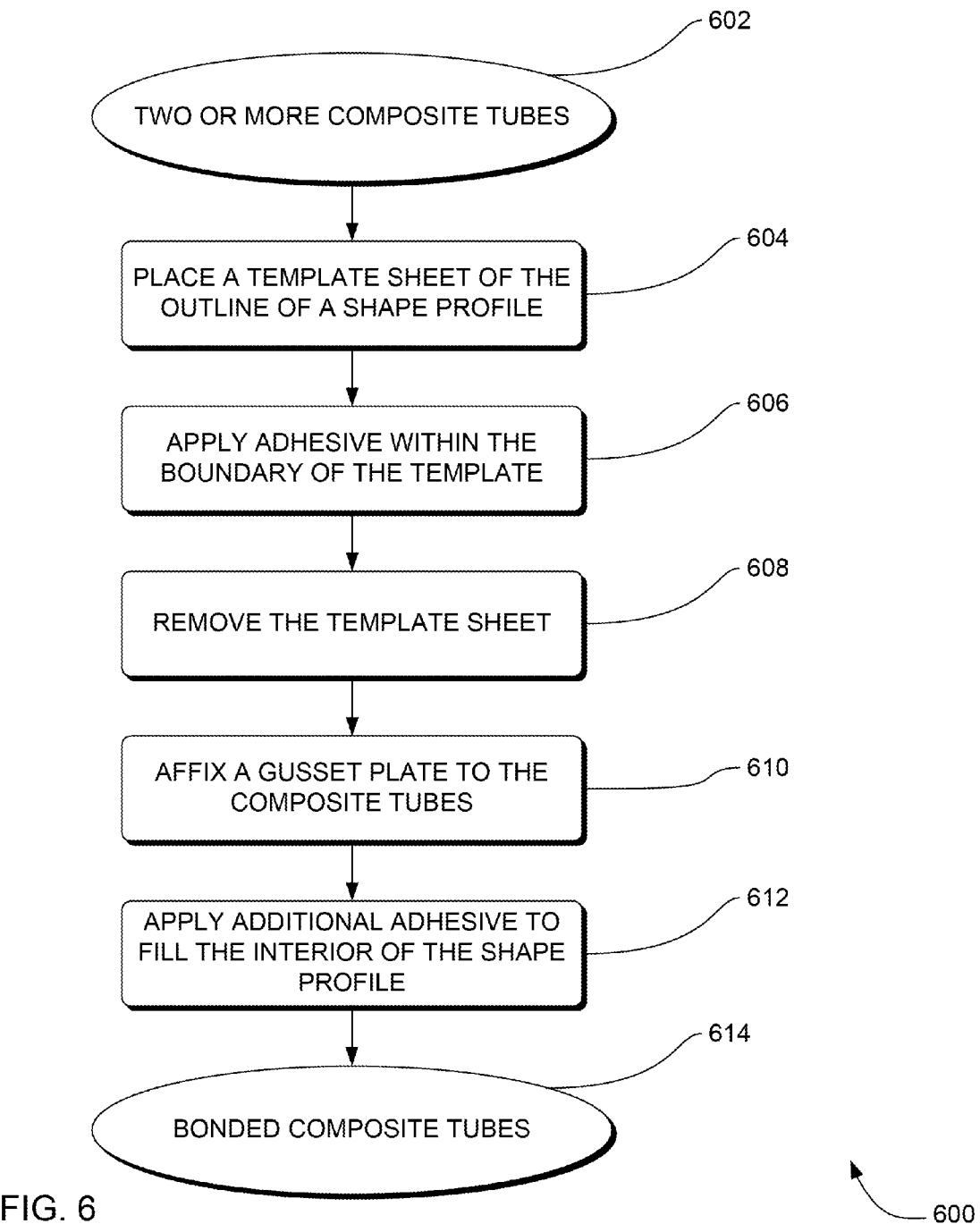
FIG. 6 is a flowchart of a method to accurately and precisely bond two or more composite tubes by applying adhesive tailored to a predefined shape with a controlled final bond line thickness onto the composite tubes, such that the bond survives cryogenic temperatures and demanding, high stress launch vehicle environment according to an aspect.

FIG. 6 is a flowchart of a method 600 to accurately and precisely bond two or more composite by applying adhesive tailored to a predefined shape with a controlled final bond line thickness onto the composite tubes, such that the bond survives cryogenic temperatures and demanding, high stress launch vehicle environment according to an aspect. Method 600 solves the need in the art to bond primary structures such that the bond survives cryogenic temperatures and demanding, high stress launch vehicle environment.

Method 600 includes two or more un-bonded composite tubes 602, placing a stencil/template cut out sheet of the outline of a predefined shape profile onto the two or more composite tubes 604, applying adhesive within the boundary of the stencil/template cut out sheet 606, removing the stencil/template cut out sheet 608, affixing a gusset plate onto the composite tubes 610, and applying addition adhesive to fill the interior of the shape profile 612, and yields two or more bonded composite tubes 614.

In some aspects, a method to bond two or more composite tubes together to withstand cryogenic temperatures and space shuttle launch condition includes applying a thin uniform layer of adhesive in a predefined shape profile on the surface of the two or more composite tubes, and affixing a gusset plate onto the adhesive on the two or more composite tubes. In other aspects, applying a thin uniform layer of adhesive on the surface of the two or more composite tubes includes placing a stencil/template sheet of the outline of the predefined adhesive shape profile on the two or more composite tubes, applying adhesive within the boundary of the stencil/template sheet, and removing the stencil/template sheet.

In yet other aspects, affixing a gusset plate onto the adhesive on the two or more composite tube includes placing shims in the center of the bond area to control the final bond line thickness, affixing a gusset plate with a hole pattern on its face onto the adhesive on the two or more composite tubes, allowing the adhesive to cure thereby forming an adhesive dam, removing the shims, and injecting additional adhesive through the hole pattern on the face of the gusset plate to completely fill the interior of the adhesive shape profile.

In some aspects, applying adhesive within the boundary of the stencil/template cut out sheet includes placing the stencil/template cut out sheet such that the adhesive is kept from bonding all the way to the cut edge of each of the two or more composite tubes being bonded, applying adhesive within the boundary of the stencil/template sheet cut out, and scraping off any excess adhesive.

In other aspects, applying adhesive within the boundary of the stencil/template cut out sheet includes shaping the adhesive with a generous radius in areas on the two or more composite tubes of high expected stress. In yet other aspects, the radius of the circular pattern of the adhesive profile shape is the full radius of the bond width.

In yet other aspects, applying adhesive within the boundary of the stencil/template cut out sheet includes placing the stencil/template cut out sheet such that the need for adhesive clean up during assembly of areas that have no access is minimized, and applying adhesive within the boundary of the stencil/template sheet cut out, and scraping off any excess adhesive.

The appendix attached hereto includes structural details and test analysis data of a structural member and associated bond joints according to one embodiment of the present invention the entire contents of which are hereby incorporated herein by reference. A summary of the detailed discussion regarding the structural and test data will now be given with reference to FIG. 3.

The structure members 302, 404, & 306 are square tube carbon fiber laminates having a wall thickness of 2.42 mm. The gusset plate 308 is QI laminate having a thickness of 2.28 mm. Tubes 302 & 306 are angled relatively to the tube 304. Preferably no acute angle exists between structural members bridged by a gusset plate. Members 302 & 306 are positioned at a 45 degree angle relative to tube 304. Members 302 & 306 are positioned at a 45 degree angle relative to tube 304. Preferably the smallest angle between adjacent joined tube members is 30 degrees for using the full radius bond profile of 25 mm. The bond areas shown as 310 preferably has a smooth continuous outer periphery with no small curves less than a radius of curvature of 12.5 millimeters proximate the cute end of tube for angles less than 30 degrees. A workable adhesive is EA9309.3NA and preferably has a thickness of the order of 0.010-0.04 inches. The bond areas is also preferably sufficiently offset from the ends or sides of the tube by at least 0.25 inches which has been sufficiently demonstrated to avoid delaminating the carbon fiber laminate tubes adjacent the cut end of the tube.

The structural assembly is assembled by laying out pr positioning each structural member 302, 204, & 306 in a desired position relative to one another. A stencil 102 is positioned on top of an exposed surface of each of the structural tubes. A first amount of adhesive is applied over the opening of the stencil and the adhesive spread to sufficiently force the adhesive through the opening of the stencil and contact the surface of the tubes. Excess adhesive is then removed in any commonly known methods in the art. The stencil is fabricated with a predetermined desired shape to define the outer boundary of the bond area. However, the shape of the stencil opening is preferably limited to only a strip to define the outermost boundaries of the bond area. The pattern of the strip and the placement of the stencil is such to ensure that the bond area remains clear of the edges of the tube, maximizes the smallest radius of curvature and avoids small changes in dimensions. Preferably the strip transitions from a straight line along its edges to the a maximum radius of curvature to transition from one side of the tube to the other while maintaining a ¼ inch clearance from terminal cut end of the tube. The same procedure is repeated for each tube 302-206. It is noted the either the same stencil or different stencils may be used to deposit the initial strip of adhesive. A similar stencil may be used for tubes 302 & 306 to accommodate the angled cut ends and a different stencil for tube 304. The geometry of the tube ends and dimensions of the tubes will dictate the shape of the strip and bond area while striving to avoid small radii of curvature and stay ¼ inch distance from end of the tube.

Once the initial adhesive is applied using the stencil, the stencil is carefully removed from each tube, the gusset plate is positioned and simply placed on the strip of adhesive and pressed down slightly to compress/squeeze the adhesive to achieve a controlled spreading and placement of the perimeter bond strip, and to guarantee a continuous and uninterrupted bond strip that once cured, will completely control the flow of subsequently injected adhesive. As previously mentioned, shims may be used to maintain a desired thickness of the bond. Preferably the thickness of the stencil will be about four times the thickness of the shims to achieve a controlled spreading of the adhesive dam shape, and to guarantee a continuous and uninterrupted adhesive strip with final thickness about equal to the thickness of the shims. The assembly is simply left alone until the strips of adhesive have cured establishing an initial bond between each tube and the gusset plate and thereby forming an initial connection between the tubes.

The gusset plate has a series of holes located atop the bond area to facilitate applying a second amount of adhesive to fill the bond area. Preferably the holes are positioned in a line extending just inside the outermost boundary of the bond area adjacent the cut terminal end of the tube (304) to the opposite end of the bond are located inward the tube. Because the strip of adhesive has cured it will act as a dam as subsequent adhesive is injected into the holes. The adhesive is preferably first injected into the hole closest to the radius end of the dam. The fluid adhesive fills the void between the gusset plate 306 and the tube 305. The dam causes the adhesive to force out any air or other gases in the void/bond area. Preferably sufficient adhesive is introduced into the first hole until the adhesive fills the void past the second hole. Adhesive is then subsequently injected into the second hole until the adhesive reaches the next hole. This process is repeated until the entire void is filled and the bond area completed. This process ensures a complete fill and forces out any air or other contaminates. Once the entire bond area has been filled for tube, the assembly is left to cure. The resultant bonded joints have been shown to have excellent strength and exceed design criteria down to 19 degrees Kelvin.

A bond joint similar to that of tube members 304 & 306 of FIG. 3 was performed and shown to exceed design criteria. Specifically as shown in the Appendix, adjacent tubular members were subjected to five temperature cycles between room temperature and 19 degrees Kelvin. The bond arrangement was tested for transverse shear (0.41 kips nominal) and axial tension tested (2.9 Kips nominal). The assembly was also tested to failure/axial tension failure (7.01-9.41 Kips) which exceeds a threshold requirement of 5.68 kips. Further details regarding the specific dimensions and structural composition of the assembly and associated test data results are identified in the Appendix attached hereto.

An apparatus and method for advanced adhesive bond shape tailoring for large composite primary structures subject to cryogenic and ambient loading environments is described. Although specific aspects are illustrated and described herein, it will be appreciated by those of ordinary skill in the art that any arrangement which is calculated to achieve the same purpose may be substituted for the specific aspects shown. This application is intended to cover any adaptations or variations. For example, although described in sheet metal cut out stencil terms, one of ordinary skill in the art will appreciate that implementations can be made in plastic cut out stencil or any other stencil/template that provides the required function.

In particular, one of skill in the art will readily appreciate that the names of the methods and apparatus are not intended to limit aspects. Furthermore, additional methods and apparatus can be added to the components, functions can be rearranged among the components, and new components to correspond to future enhancements and physical devices used in aspects can be introduced without departing from the scope of embodiments. One of skill in the art will readily recognize that aspects are applicable to future composite structures, and different composite structures that do not necessarily operate in cryogenic environments.

The terminology used in this application is meant to include all stencil cut out sheets, methods to tailor the adhesive profile shape by using a stencil cut out sheet and all cryogenic and high stress environments and alternate technologies which provide the same functionality as described herein.

What is claimed is:

1. A method of bonding at least two surfaces together comprising the steps of:

applying a first strip of adhesive to a first surface along a predefined outer boundary of a bond area thereby defining a remaining open area therewithin;

affixing a second surface onto said first strip of adhesive before said first strip of adhesive has cured;

allowing said first strip of adhesive to substantially cure and thereby initially bond said first and second surfaces and thereafter;

applying a second amount of adhesive to cover said remaining open area and substantially fill a void between said first and second surfaces within said bond area.

2. The method of claim 1, wherein said step of applying said first strip of adhesive includes the steps of:
   placing a stencil having an open pattern corresponding to said predefined outer boundary of said bond area on said first surface;
   spreading adhesive across said stencil sufficient to urge said first amount of adhesive through said open pattern and onto said first surface;
   removing any excess adhesive; and
   removing said stencil from said first surface.

3. The method of claim 2 wherein, after said step of applying said first strip of adhesive, said method further includes:
   placing shims within said open area prior to affixing said second surface onto said first amount of adhesive to maintain a fixed distance between said first and second surfaces to thereby control a final bond thickness; and
   removing the shims prior to applying said second amount of adhesive.

4. The method of claim 1, wherein said second surface is a substantially plate-like member having a plurality of successive holes therethrough to facilitate injection of adhesive into said void, said step of applying said second amount of adhesive including;
   injecting additional adhesive through a first one of said successive holes located proximate a first end of said boundary and thereafter progressively injecting adhesive through successive adjacent holes to thereby progressively fill said void from one end of said bond area to an opposite end of said bond area.

5. The method of claim 3, wherein said step of placing said stencil and said shims includes providing said stencil having a thickness of 0.04 inches and shims having a thickness of 0.01 inches to thereby create an overall bond thickness of 0.01 inches.

6. The method according to claim 1, wherein said first step of applying said strip of adhesive includes positioning said strip on said first surface no closer than ¼ inch from a terminal end of said first surface.

7. The method according to claim 1, where in the step of applying said first strip of adhesive no portion of said first strip of adhesive extending along its profile has a radius of curvature less than 12.5 mm.

8. The method according to claim 1, wherein said first surface is an elongated tubular structure including at least one planar surface having a length extending from a terminal end to an opposite end and a width extending between opposing ends thereof, where in said step of applying said first strip of adhesive includes ensuring that no portion of said first strip of adhesive extending along its profile has a radius of curvature less than 25% said width of said planar surface of said tubular structure.

9. The method according to claim 1, further includes
   applying a second strip of adhesive to a third surface along a second predefined outer boundary of a second bond area thereby defining a second remaining open area therewithin; and
   said step of affixing a second surface includes affixing said second surface to said second strip such that said third surface bridges said first and second;
   allowing the first and second strips of adhesive to substantially cure and thereby initially bond said second surface to each of said first and third surfaces thereby forming a connection between said first and third surfaces; and said step of applying a second amount of adhesive includes applying adhesive to cover said second remaining open area and substantially fill a void between said third and second surfaces within said second bond area.

10. The method according to claim 9, wherein each of said first and third surfaces are part of separate elongated tubes having a substantially rectangular cross section formed of carbon fiber laminate, said second surface is a gusset plate, and said steps of applying said strips of adhesive includes positioning said strips on each of said first and third surfaces proximate to but no closer than ¼ inch from a respective terminal end of each of said elongated tubes.

11. The method according to claim 10, where in the steps of applying said strips of adhesive includes ensuring that no portion of said strips of adhesive extending along its respective profile has a radius of curvature less than 12.5 mm.

12. The method according to claim 10, where in the steps of applying said strips of adhesive includes ensuring that no portion of said strips of adhesive extending along its respective profile has a radius of curvature less than 25% of a width of its corresponding elongated tube.

13. A method of bonding a gusset plate to a plurality of structural members to thereby form a structural connection therebetween; said method comprising the steps of:
   applying a first strip of adhesive to a first surface of a first one of said plurality of structural members along a first predefined outer boundary of a first bond area thereby defining a first remaining open area therewithin;
   applying a second strip of adhesive to a second surface of a second one said plurality of structural members along a second predefined outer boundary of a second bond area thereby defining a second remaining open area therewithin;
   affixing said gusset plate onto said first and second strips of adhesive before said strips of adhesives have cured;
   allowing said strips of adhesive to substantially cure and thereby initially bond said gusset plate to each of said first and second structural members forming a connection therebetween;
   applying a second amount of adhesive to cover each of said first and second said remaining open areas and substantially fill voids between said gusset plates and said first and second bond areas.

14. The method of claim 13, wherein said steps of applying said strips of adhesive includes the steps of:
   placing a first stencil first open pattern corresponding to said first predefined outer boundary of said first bond area on said first structural member;
   spreading adhesive across said first stencil sufficient to urge said adhesive through said first open pattern and onto said first structural member, removing any excess adhesive and removing said first stencil from said first structural member;
   placing a second stencil having a second open pattern corresponding to said second predefined outer boundary of said second bond area on said second structural member;
   spreading adhesive across said second stencil sufficient to urge said adhesive through said second open pattern and onto said second structural member, removing any excess adhesive and removing said second stencil from said second structural member.

15. The method of claim 14 wherein, after said steps of applying said strip of adhesive, said method further includes:
   placing shims within said first and second open areas prior to affixing said gusset plate onto said first and second strips of adhesive to maintain a fixed distance between said gusset plate and said first and second structural members to thereby control a final bond thickness.

16. The method of claim 15, wherein said gusset plate has a plurality of successive holes therethrough along a width of each of said first and second bond areas to facilitate injection of adhesive into each of said voids, said step of applying said second amount of adhesive including;

injecting additional adhesive through a first one of said successive holes of each of said first and second bond areas located adjacent a terminal end of a respective structural member and thereafter progressively injecting adhesive through successive adjacent holes to thereby progressively fill said voids to an end of the bond areas opposite said terminal end.

17. The method of claim 15, wherein said step of placing said stencil and said shims includes providing said stencil having a thickness of 0.04 inches and shims having a thickness of 0.01 inches and pressing said gusset plate down to contact said shims and compressing said adhesive strip to thereby create an overall bond thickness of 0.01 inches.

18. The method according to claim 13, wherein said steps of applying said strips of adhesive includes positioning said strips on each of said first and second structural members no closer than ¼ inch from a terminal end thereof.

19. The method according to claim 13, wherein each of said first and second structural members are elongated tubular structures formed of carbon fiber laminate including at least one planar surface having a length extending from a terminal end to an opposite end thereof, said steps of applying said strips of adhesive includes applying said strip of adhesive to said planar surface proximate said terminal end but no closer than ¼ inch thereto such that that no portion of said strip of adhesive extending along its profile has a radius of curvature less than 12.5 mm.

20. The method according to claim 13, wherein said first and second structural members are elongated tubular structures formed of carbon fiber laminate including at least one planar surface having a length extending from a terminal end to an opposite end and having a width extending between opposing sides thereof, where in said steps of applying said strips of adhesive includes ensuring that no portion of said strips of adhesive extending along its respective profile has a radius of curvature less than 25% said width of its associated structural member.

21. The method according to claim 13, wherein said steps of applying said strips of adhesive includes of applying said strips of adhesive such that no portion of said strips of adhesive extending along its respective profile has a radius of curvature less than 12.5 mm.

* * * * *